United States Patent
Bostick et al.

(10) Patent No.: US 10,928,887 B2
(45) Date of Patent: *Feb. 23, 2021

(54) DISCONTINUING DISPLAY OF VIRTUAL CONTENT AND PROVIDING ALERTS BASED ON HAZARDOUS PHYSICAL OBSTRUCTIONS

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/206,165

(22) Filed: Nov. 30, 2018

(65) Prior Publication Data

US 2019/0094952 A1    Mar. 28, 2019

Related U.S. Application Data

(63) Continuation of application No. 15/453,228, filed on Mar. 8, 2017, now Pat. No. 10,169,973.

(51) Int. Cl.
| | | |
|---|---|---|
| *G06F 3/00* | (2006.01) | |
| *G06F 3/01* | (2006.01) | |
| *G06F 1/16* | (2006.01) | |
| *G08B 21/04* | (2006.01) | |

(52) U.S. Cl.
CPC .............. *G06F 3/002* (2013.01); *G06F 1/163* (2013.01); *G06F 3/011* (2013.01); *G08B 21/0476* (2013.01)

(58) Field of Classification Search
CPC ...... G06F 3/002; G06F 3/011; H08B 21/0476
USPC ........ 345/8, 156; 340/932.2; 726/17; 604/20
See application file for complete search history.

(56) References Cited

U.S. PATENT DOCUMENTS

| | | |
|---|---|---|
| 6,679,702 B1 | 1/2004 | Rau |
| 8,913,009 B2 | 12/2014 | Takeda et al. |
| 9,395,543 B2 | 7/2016 | Lamb et al. |
| 9,779,605 B1 | 10/2017 | Taylor et al. |

(Continued)

FOREIGN PATENT DOCUMENTS

| | | |
|---|---|---|
| JP | 2015068831 | 4/2015 |
| WO | 2013052855 | 4/2013 |
| WO | 2015009887 | 1/2015 |

OTHER PUBLICATIONS

Office Action from U.S. Appl. No. 15/650,078, dated Feb. 26, 2019; 21 pages.

(Continued)

*Primary Examiner* — Prabodh M Dharia (74) *Attorney, Agent, or Firm* — Brian Restauro; Andrew D. Wright; Roberts Calderon Safran & Cole, P.C.

(57) ABSTRACT

A computer-implemented method includes: detecting, by a virtual wearable computing device, a hazardous condition based on monitoring a proximity of a user wearing the virtual wearable computing device to a physical obstruction; and alerting, by the virtual wearable computing device, the user regarding the detection of the hazardous condition.

20 Claims, 8 Drawing Sheets

(56) References Cited

U.S. PATENT DOCUMENTS

| | | | |
|---|---|---|---|
| 10,169,973 B2 | 1/2019 | Bostick et al. | |
| 10,183,231 B1* | 1/2019 | Lowe | A63H 33/22 |
| 10,204,455 B2 | 2/2019 | Yao et al. | |
| 10,416,946 B1* | 9/2019 | Cronin | G02B 27/017 |
| 10,447,966 B2* | 10/2019 | Ritchey | H04N 7/15 |
| 2002/0044152 A1 | 4/2002 | Abbott, III et al. | |
| 2003/0025651 A1 | 2/2003 | Susnjara et al. | |
| 2003/0025652 A1 | 2/2003 | Susnfara et al. | |
| 2003/0216859 A1* | 11/2003 | Martell | G01C 21/3492 |
| | | | 701/421 |
| 2007/0276709 A1 | 11/2007 | Trimby et al. | |
| 2008/0062167 A1 | 3/2008 | Boggs et al. | |
| 2009/0100096 A1 | 4/2009 | Erlichson et al. | |
| 2011/0092882 A1 | 4/2011 | Firlik et al. | |
| 2013/0293586 A1 | 11/2013 | Kaino et al. | |
| 2013/0328928 A1 | 12/2013 | Yamagishi et al. | |
| 2014/0123325 A1 | 5/2014 | Jung et al. | |
| 2014/0303892 A1* | 10/2014 | Morlock | G01C 21/20 |
| | | | 701/533 |
| 2014/0316192 A1 | 10/2014 | de Zambotti et al. | |
| 2014/0354684 A1 | 12/2014 | Beckwith et al. | |
| 2014/0380425 A1* | 12/2014 | Lockett | H04L 63/20 |
| | | | 726/4 |
| 2015/0024368 A1 | 1/2015 | King, Jr. | |
| 2015/0049018 A1 | 2/2015 | Gomez | |
| 2015/0279210 A1 | 10/2015 | Zafiroglu et al. | |
| 2015/0309316 A1* | 10/2015 | Osterhout | G06F 3/0346 |
| | | | 345/8 |
| 2015/0367231 A1 | 12/2015 | Kim | |
| 2016/0026253 A1 | 1/2016 | Bradski et al. | |
| 2016/0057726 A1 | 2/2016 | Bai et al. | |
| 2016/0093105 A1 | 3/2016 | Rimon et al. | |
| 2016/0093108 A1* | 3/2016 | Mao | A63F 13/42 |
| | | | 345/633 |
| 2016/0178906 A1* | 6/2016 | Rider | G02B 27/0172 |
| | | | 726/17 |
| 2016/0232717 A1* | 8/2016 | Wong | G02B 27/0093 |
| 2016/0284125 A1 | 9/2016 | Bostick et al. | |
| 2016/0335808 A1* | 11/2016 | Novak | G06T 19/006 |
| 2016/0350973 A1 | 12/2016 | Shapira et al. | |
| 2016/0373473 A1* | 12/2016 | Truong | H04W 4/029 |
| 2017/0140757 A1* | 5/2017 | Penilla | H04L 67/12 |
| 2017/0178272 A1 | 6/2017 | Lashkari et al. | |
| 2017/0193705 A1 | 7/2017 | Mullins et al. | |
| 2017/0201779 A1 | 7/2017 | Publicover et al. | |
| 2017/0235931 A1 | 8/2017 | Publicover et al. | |
| 2017/0247037 A1 | 8/2017 | Basir et al. | |
| 2017/0301137 A1* | 10/2017 | Luo | G06F 3/013 |
| 2017/0323356 A1 | 11/2017 | Gharabegian | |
| 2017/0358141 A1* | 12/2017 | Stafford | G06F 3/011 |
| 2017/0367651 A1 | 12/2017 | Tzvieli et al. | |
| 2017/0372499 A1 | 12/2017 | Lalonde | |
| 2018/0004286 A1 | 1/2018 | Chen | |
| 2018/0053352 A1 | 2/2018 | Finding et al. | |
| 2018/0075309 A1 | 3/2018 | Sathyanarayana et al. | |
| 2018/0075659 A1 | 3/2018 | Browy et al. | |
| 2018/0086452 A1 | 3/2018 | Hunt et al. | |
| 2018/0102985 A1 | 4/2018 | Byers et al. | |
| 2018/0117446 A1 | 5/2018 | Tran et al. | |
| 2018/0120842 A1 | 5/2018 | Smith et al. | |
| 2018/0190022 A1* | 7/2018 | Zamir | G06T 19/006 |
| 2018/0247109 A1 | 8/2018 | Joseph et al. | |
| 2018/0261067 A1 | 9/2018 | Bostick et al. | |
| 2019/0094952 A1 | 3/2019 | Bostick et al. | |
| 2019/0108580 A1* | 4/2019 | Spivack | G06Q 50/163 |
| 2020/0012335 A1 | 1/2020 | Schmollgruber et al. | |

OTHER PUBLICATIONS

Spoonauer "HTC Vive Pre Adds Front Camera to Blend VR, Real World", https://www.scientificamerican.com/article/htc-vive-pre-adds-front-camera-to-blend-vr-real-world/, Scientific America, Jan. 5, 2016, 9 pages.

Mell et al., "The NIST Definition of Cloud Computing", NIST, Special Publication 800-145, Sep. 2011, 7 pages.

List of IBM Patents or Patent Applications Treated as Related' 1 page.

Specification "Altering Virtual Content Based on the Presence of Hazardous Physical Obstructions" and Drawings in U.S. Appl. No. 15/650,078, filed Jul. 14, 2017, 47 pages.

Office Action dated Jun. 17, 2019 in U.S. Appl. No. 15/650,078, 27 pages.

Final Office Action dated Dec. 2, 2020 in U.S. Appl. No. 15/650,078, 31 pages.

Notice of Allowance dated Feb. 18, 2019 in U.S. Appl. No. 15/650,078, 15 pages.

* cited by examiner

DISCONTINUING DISPLAY OF VIRTUAL CONTENT AND PROVIDING ALERTS BASED ON HAZARDOUS PHYSICAL OBSTRUCTIONS

BACKGROUND

The present invention generally relates to virtual wearable computing devices and, more particularly, to discontinuing display of virtual content on virtual wearable computing devices and providing alerts based on the presence of hazardous physical obstructions.

A virtual wearable computing device (e.g., virtual reality goggles, glasses, or the like) may display virtual content to a user as the virtual wearable computing device is worn by the user. For example, virtual wearable computing devices may be used for gaming, educational applications, virtual touring, or the like. Virtual wearable computing devices may run interactive applications that may respond to user movement (e.g., walking, running, body movements, etc.). For example, as the user physically moves, a virtual reality application may correspondingly move a virtual character, corresponding to the user, through a virtual world. Similarly, a virtual character may perform other actions within the virtual world based on the user's physical movements, gestures, and/or commands from an accessory device such as a gaming controller.

SUMMARY

In an aspect of the invention, a computer-implemented method includes: detecting, by a virtual wearable computing device, a hazardous condition based on monitoring a proximity of a user wearing the virtual wearable computing device to a physical obstruction; and alerting, by the virtual wearable computing device, the user regarding the detection of the hazardous condition.

In an aspect of the invention, there is a computer program product for alerting a user of a hazardous condition while the user is engaged in a virtual application while wearing a virtual wearable computing device. The computer program product includes a computer readable storage medium having program instructions embodied therewith, the program instructions are executable by the virtual wearable computing device to cause the virtual wearable computing device to: monitor a proximity of a user wearing the virtual wearable computing device to a physical obstruction; detect a hazardous condition based on monitoring a proximity of a user wearing the virtual wearable computing device to a physical obstruction; and discontinue display of virtual content based on the detection of the hazardous condition.

In an aspect of the invention, a system includes: a CPU, a computer readable memory and a computer readable storage medium associated with a virtual wearable computing device; program instructions to program instructions to detect a hazardous condition based on monitoring a proximity of a user wearing the virtual wearable computing device to a physical obstruction; program instructions to discontinue display of virtual content based on the detection of the hazardous condition; and program instructions to provide an audible or visual alert based on the detection of the hazardous condition. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to virtual wearable computing devices and, more particularly, to discontinuing display of virtual content on virtual wearable computing devices and providing alerts based on the presence of hazardous physical obstructions. A user using a virtual wearable computing device may become immersed in a virtual application in which the user may become unaware of their physical surroundings. That is, the user may be at risk of colliding with objects/obstructions (e.g., furniture, other individuals, animals/pets, walls, vehicles, etc.) since the user cannot see their physical surroundings while using a virtual wearable computing device and while immersed in a virtual application. Thus, the use of virtual wearing computing devices may pose a hazard to the user and/or surrounding individuals. Accordingly, aspects of the present invention may monitor the user's proximity to physical obstructions using one or more camera devices that may obtain a 360-degree view of the user's physical surroundings.

Further, aspects of the present invention may detect when the user is within a threshold proximity or distance of a physical obstruction, alert the user to warn the user that the user is at risk for colliding with the obstruction. Further, aspects of the present invention may discontinue presenting virtual content within a display of the virtual computing device and instead present real-life images from the camera devices of the virtual computing device. That is, aspects of the present invention may interchange the content displayed on the virtual wearable computing device from virtual content to real-life imagery as captured by the camera devices on the virtual wearable computing device. In this way, the user may receive advance notice of potential hazards, immediately view the physical world without the user needing to remove the virtual wearable computing device, and adjust their movements accordingly to avoid collision with obstructions/objects. As a result, aspects of the present invention may reduce the chances and severity of injury to the user and/or surrounding individuals, as well as prevent and/or reduce the damage to objects surrounding the user.

As described herein, aspects of the present invention may utilize multiple camera devices on the virtual wearable computing device to obtain a 360-degree view of the user's surroundings. Aspects of the present invention may implement a different set of alerting criteria for different users. For example, aspects of the present invention may utilize user profile information relating to user reaction times, user accident history, etc. to determine conditions under which an alert should be provided and/or content viewing be interchanged from virtual content to real-life viewing. As an illustrative example, alerting and view interchanging may be triggered based on different threshold distances to obstructions for different users having different reaction times, or for different users having different accident histories, ages, etc.

As described herein, the user's anticipated travel path and/or anticipated movements may be taken into consideration when providing alerts and/or interchanging views. For example, the user's anticipated travel path and/or anticipated movements may be determined based on the virtual content and the details of a virtual application currently being used by the user. As an example, aspects of the present invention may anticipate that a user may walk forward in a particular direction for 10 paces based on the content of the virtual application. Similarly, aspects of the present invention may anticipate that a user may suddenly turn their body in one direction (e.g., based on virtual content that would trigger the user's movements, such as the sudden appearance of character or object in a virtual reality game, etc.). Based on the user's anticipated travel path and/or movements, aspects of the present invention may identify obstructions, with which the user may be at risk of colliding, and correspondingly, provide the alert and/or interchange the view displayed on the virtual wearable computing device from virtual content to a real-world view.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
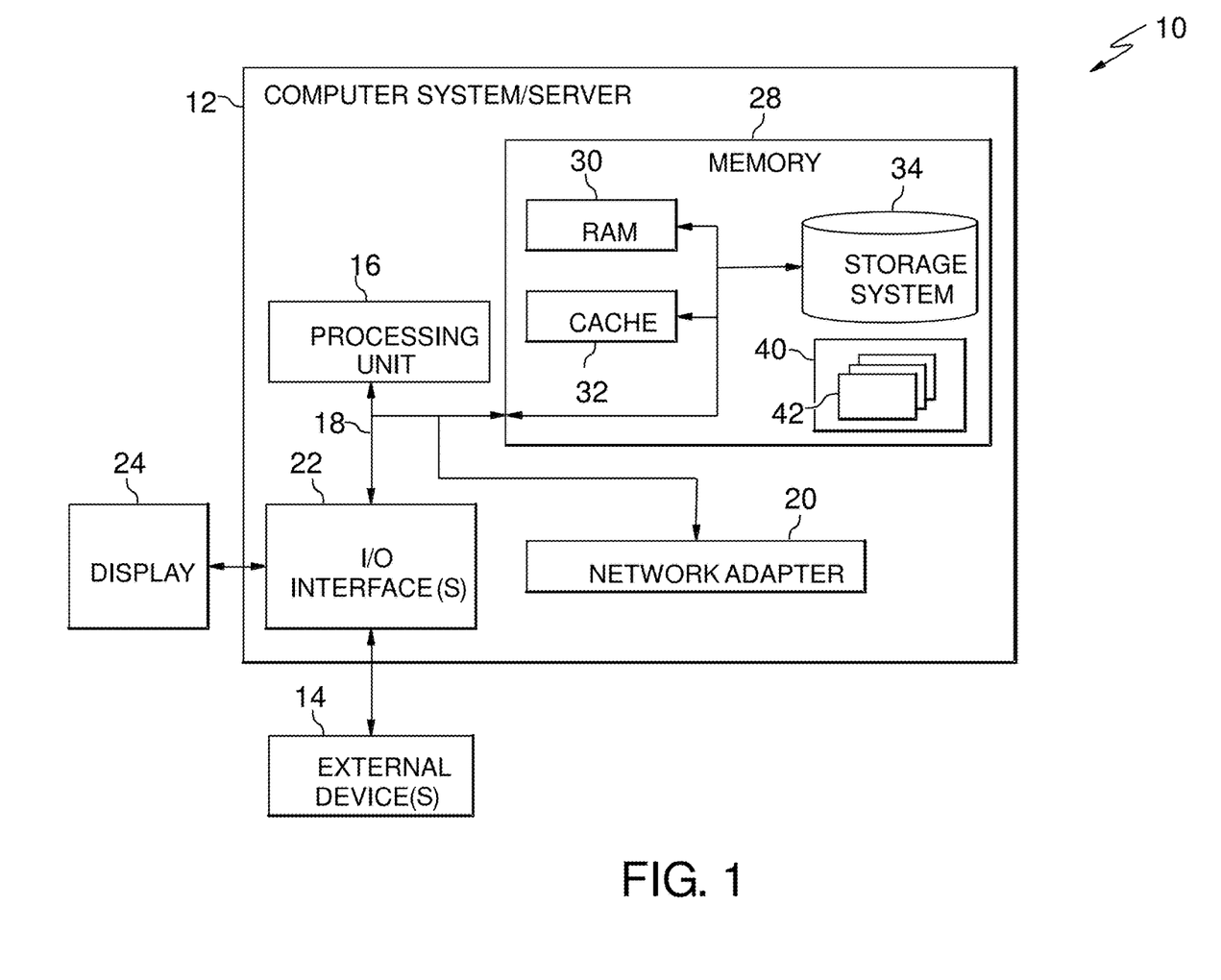
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
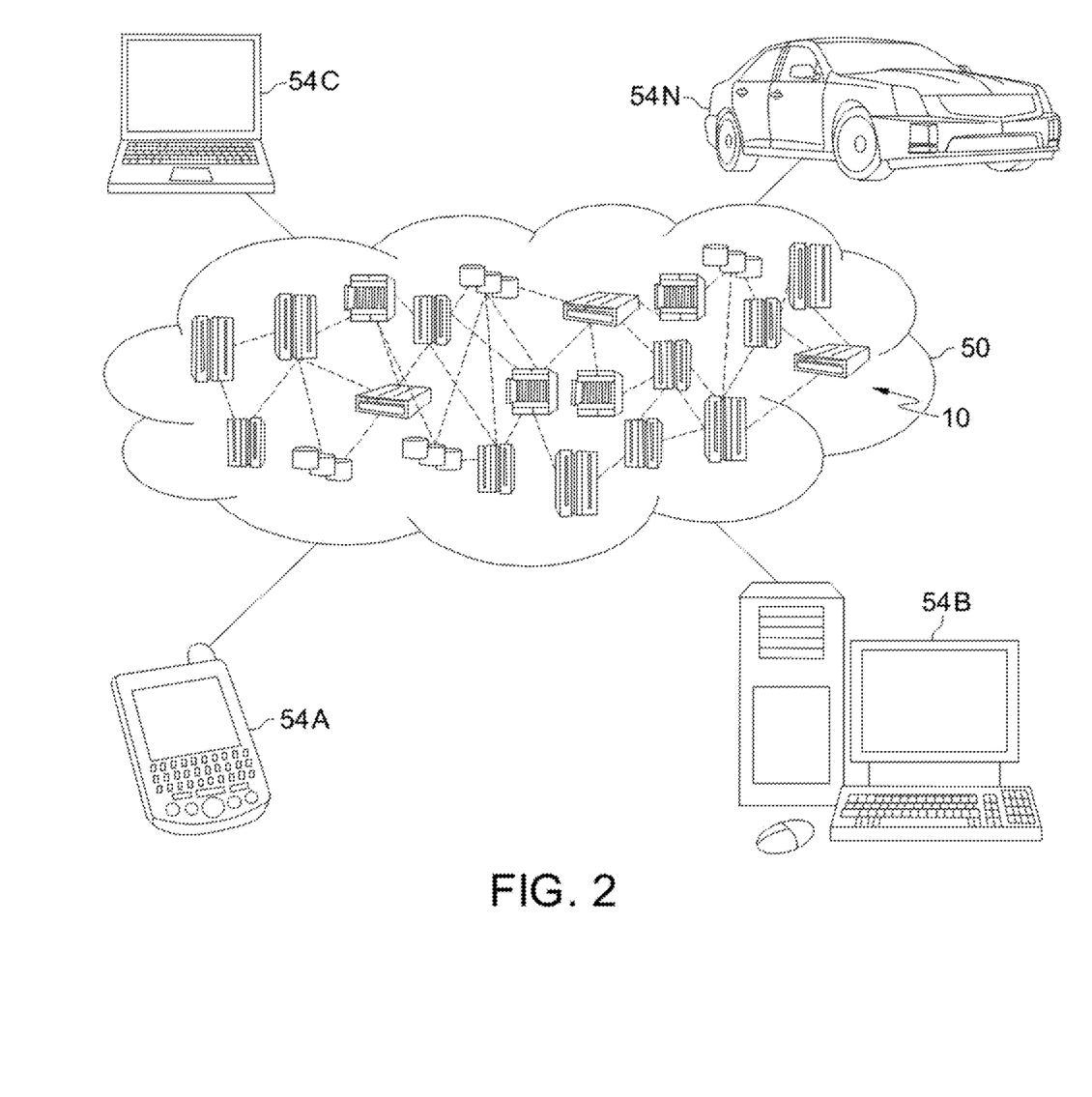
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
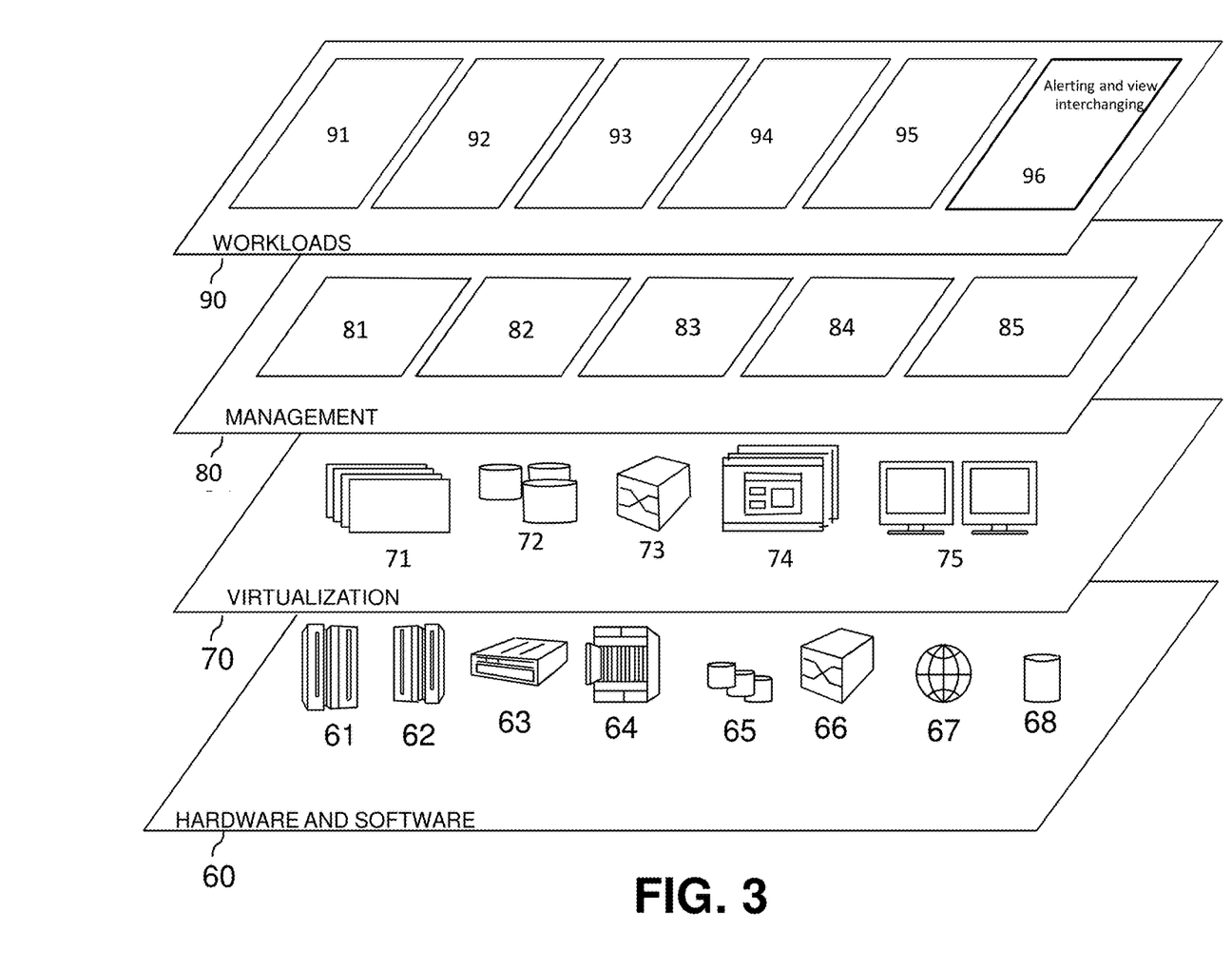
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alerting and view interchanging 96.

Referring back to FIG. 1, the program/utility 40 may include one or more program modules 42 that generally carry out the functions and/or methodologies of embodiments of the invention as described herein (e.g., such as the functionality provided by alerting and view interchanging 96). Specifically, the program modules 42 may monitor the proximity of a user to objects in the physical world, determine the user's future path and movements based on virtual content, detect satisfaction of criteria based on proximity to object and/or user's further path and movements, provide alert based on detecting the satisfaction of the criteria, and discontinue display of virtual content. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of view interchanging and alerting component 215 as shown in FIG. 4.

Figure 4A:
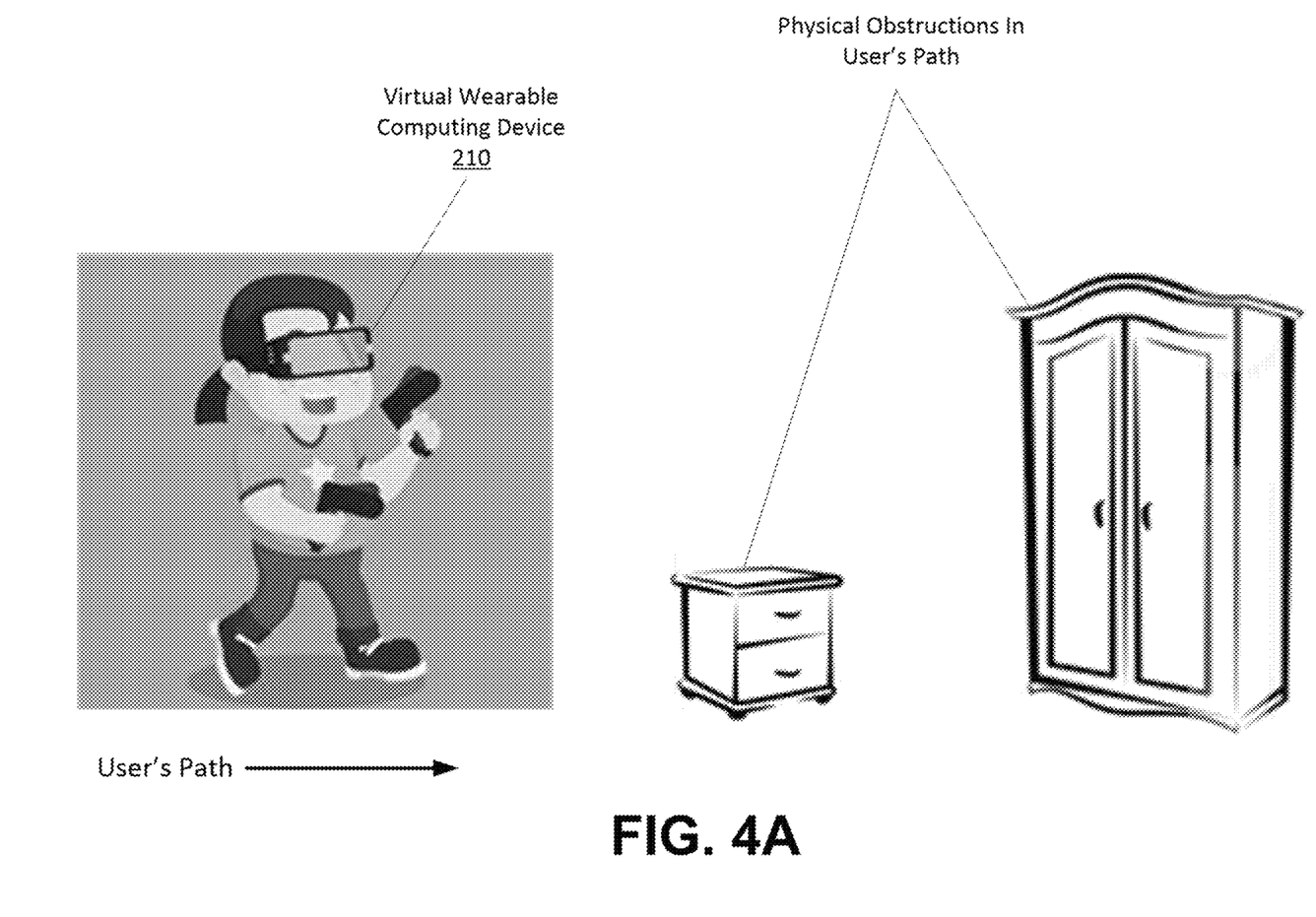
FIGS. 4A and 4B show an overview of an example implementation in accordance with aspects of the present invention
Figure 4B:
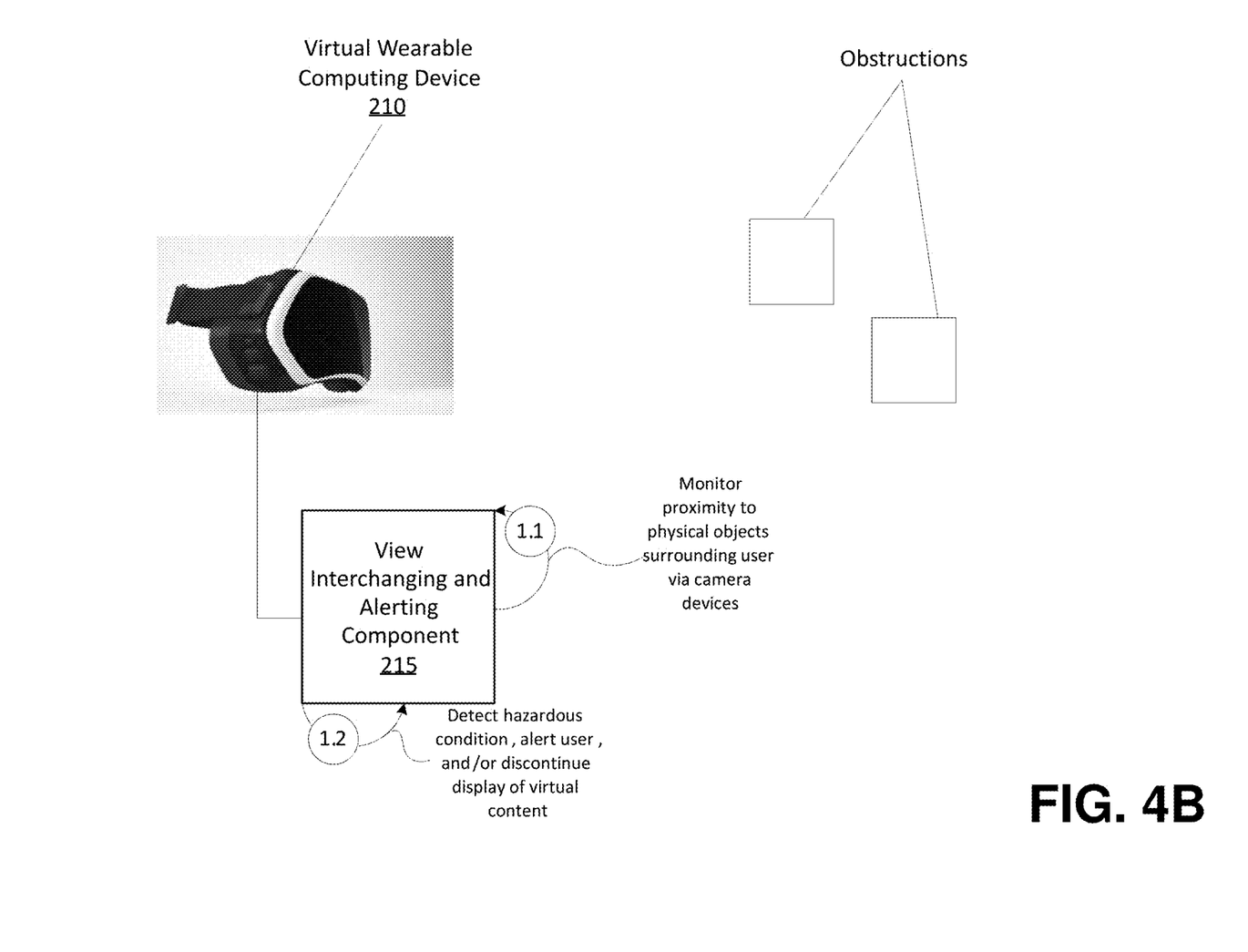

FIGS. 4A and 4B show an overview of an example implementation in accordance with aspects of the present invention. As shown in FIG. 4A, as a user wears a virtual wearable computing device 210, the user may be in danger of colliding with an obstruction (e.g., furniture, other individuals, animals/pets, walls, vehicles, etc.). In particular, the user may be at risk of colliding with the obstruction since the user cannot see their physical surroundings while wearing the virtual wearable computing device 210 and while immersed in a virtual application. Thus, the use of virtual wearing computing devices 210 may pose a hazard to the user and/or surrounding individuals. Accordingly, aspects of the present invention may monitor the user's proximity to physical obstructions using one or more camera devices that may obtain a 360-degree view of the user's physical surroundings.

Referring to FIG. 4B, the virtual wearable computing device 210 may include a view interchanging and alerting component 215 that monitors the user's proximity to physical objects surrounding the user (step 1.1). For example, the view interchanging and alerting component 215 may use camera devices implemented by the virtual wearable computing device 210 to monitor a 360-degree view of the user's surroundings. The view interchanging and alerting component 215 may use object detection and/or image analysis techniques to detect the presence of objects within the field of view of the cameras. Further, the view interchanging and alerting component 215 may use object distance analysis to determine the distance between the cameras and the obstructions (e.g., corresponding to the distance between the users and the obstructions). At step 1.2, the view interchanging and alerting component 215 may detect a hazardous condition based on monitoring the proximity to physical objects surrounding the user. For example, the view interchanging and alerting component 215 may detect a hazardous condition when the user comes to within a threshold distance of the obstruction (or vice versa). Additionally, or alternatively, the view interchanging and alerting component 215 may detect a hazardous condition based on the user's anticipated travel path and/or movements.

Based on detecting the hazardous condition, the view interchanging and alerting component 215 may provide an alert (e.g., audible alert, visual alert within the display of the virtual wearable computing device 210, or the like). Additionally, or alternatively, the view interchanging and alerting component 215 may discontinue display of virtual content and may interchange the displayed content from virtual content to a display of real-world images as seen by the cameras of the virtual wearable computing device 210. In this way, the user may view the physical world immediately without needing to remove the virtual wearable computing device 210. Additionally, or alternatively, the view interchanging and alerting component 215 may simply discontinue display of virtual content when the viewing display of the virtual wearable computing device 210 is transparent so as to allow the user to view the physical world when virtual content is not displayed.

Figure 5:
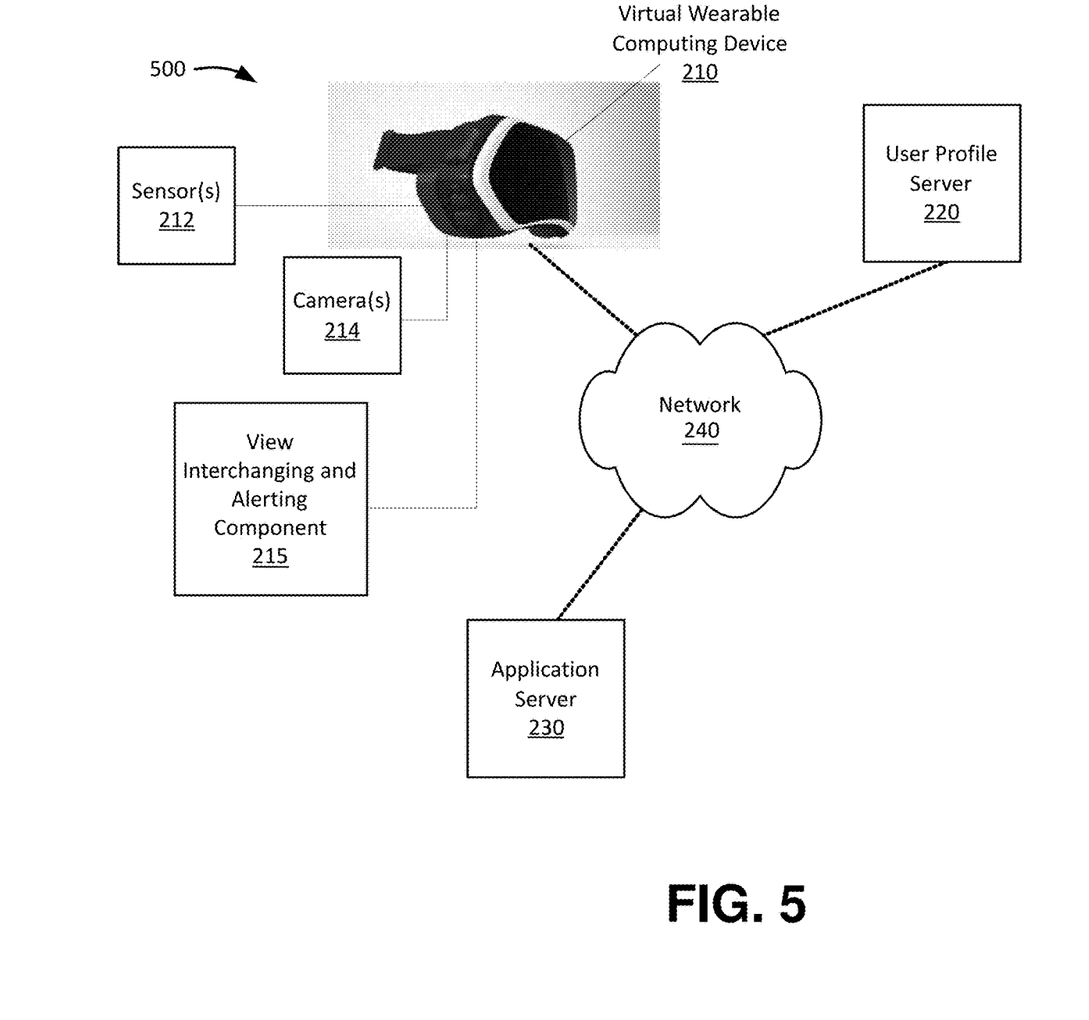
FIG. 5 shows an example environment in accordance with aspects of the present invention.

FIG. 5 shows an example environment in accordance with aspects of the present invention. As shown in FIG. 5, environment 500 may include a virtual wearable computing device 210, a user profile server 220, an application server 230, and a network 240. In embodiments, one or more components in environment 500 may correspond to one or more components in the cloud computing environment of FIG. 2. In embodiments, one or more components in environment 500 may include the components of computer system/server 12 of FIG. 1.

The virtual wearable computing device 210 may include a computing device capable of presenting virtual content to a user. For example, the virtual wearable computing device 210 may include virtual reality goggles, virtual reality glasses, or the like. Additionally, or alternatively, the virtual wearable computing device 210 may include a smart phone or similar device that may include an adapter to attach to a pair of goggles via which virtual content may be displayed on the smart phone. In embodiments, a user may wear the virtual wearable computing device 210 as eyewear such that a display of the virtual wearable computing device 210 is viewable to the user when the virtual wearable computing device 210 is worn. The virtual wearable computing device 210 may include one or more sensors 212, cameras 214, or the like. In embodiments, the sensors 212 may include object detection sensors that report sensor data identifying objects/obstructions surrounding the virtual wearable computing device 210 (and correspondingly a user wearing the virtual wearable computing device 210). The cameras 214 may be used to obtain image data that may also identify objects/obstructions surrounding the virtual wearable computing device 210 (and correspondingly a user wearing the virtual wearable computing device 210). In embodiments, the virtual wearable computing device 210 may include one or more accessory devices (e.g., remote controls) to provide user input to an application running on the virtual wearable computing device 210.

As described herein, the virtual wearable computing device 210 may include a view interchanging and alerting component 215 that may monitor the proximity of objects and/or obstructions in relation to the position of the virtual wearable computing device 210. The view interchanging and alerting component 215 may monitor image and/or sensor information from the cameras 214 and/or sensors 212 of the virtual wearable computing device 210 to monitor the proximity of objects and/or obstructions. In embodiments, the view interchanging and alerting component 215 may determine a user's anticipated path and movements based on a virtual application currently being used by the user, and detect a hazardous condition based on the user's anticipated path, movements, and proximity to objects/obstructions. In turn, the view interchanging and alerting component 215 may provide an alert and/or discontinue the display of virtual content based on detecting the hazardous condition.

The user profile server 220 may include one or more computing devices (e.g., such as computer system/server 12 of FIG. 1) that stores user information that may be used to determine customized alerts and/or criteria for detecting a hazardous condition. For example, the user profile server 220 may store information regarding user reaction times, user accident history, etc. to detect hazardous conditions under which an alert should be provided and/or content viewing be interchanged from virtual content to real-life viewing. In this way, alerting and view interchanging may be triggered based on different threshold distances to obstructions for different users having different reaction times, or for different users having different accident histories, ages, etc.

The application server 230 may include one or more computing devices (e.g., such as computer system/server 12 of FIG. 1) that communicates with the virtual wearable computing device 210 as part of executing a virtual application. For example, the application server 230 may include a gaming server that connects the virtual wearable computing device 210 to multiple other computing devices as part of a multiplayer gaming setting. Additionally, or alternatively, the application server 230 may provide different types of virtual content based on user inputs received by the virtual wearable computing device 210.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
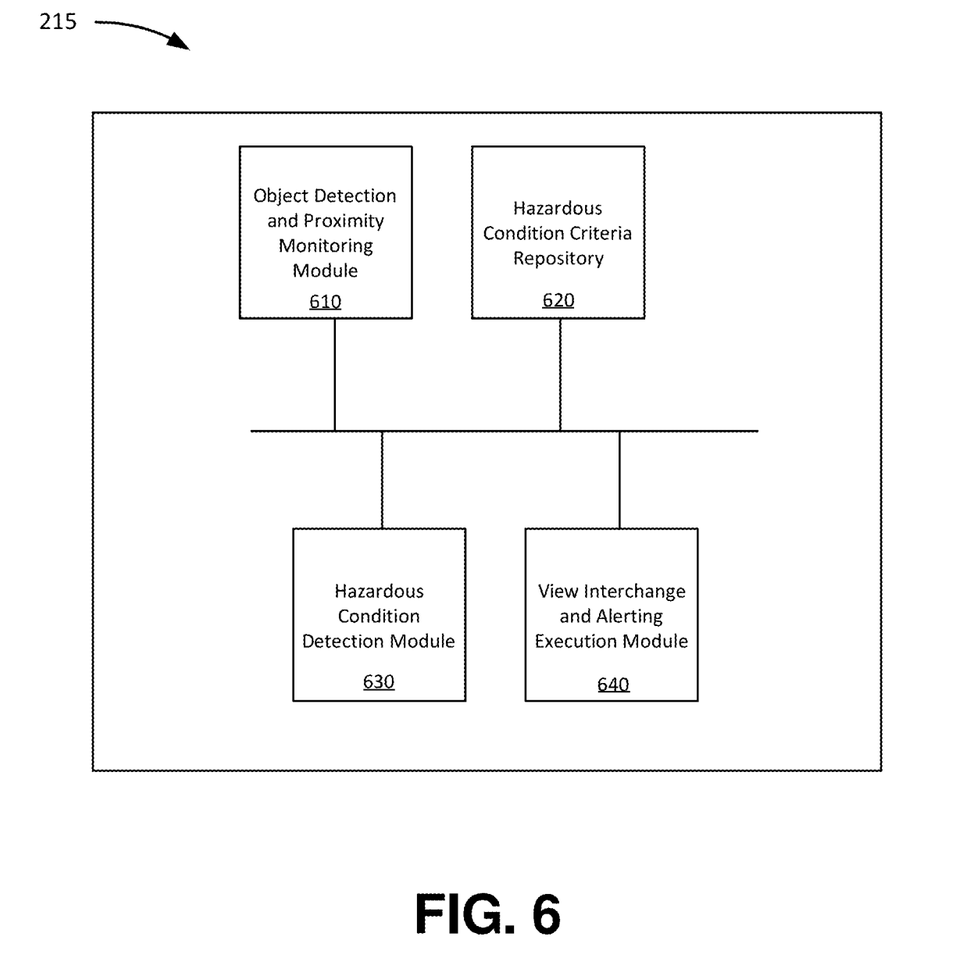
FIG. 6 shows a block diagram of example components of a view interchange and alerting component in accordance with aspects of the present invention.

FIG. 6 shows a block diagram of example components of a view interchanging and alerting component in accordance with aspects of the present invention. As shown in FIG. 6, the view interchanging and alerting component 215 may include object detection and proximity monitoring module 610, a hazardous condition criteria repository 620, a hazardous condition detection module 630, and/or a view interchange and alerting execution module 640. In embodiments, the view interchanging and alerting component 215 may include additional or fewer components than those shown in FIG. 6. In embodiments, separate components may be integrated into a single computing component or module. Additionally, or alternatively, a single component may be implemented as multiple computing components or modules.

The object detection and proximity monitoring module 610 may include a program module (e.g., program module 42 of FIG. 1) that identifies physical objects (e.g., individuals, furniture, walls, vehicles, animals, etc.) surrounding the virtual wearable computing device 210 (and hence, surrounding a wearer or user of the virtual wearable computing device 210) in the physical (non-virtual) world. In embodiments, the object detection and proximity monitoring module 610 may identify the objects using multiple cameras 214 and/or sensors 212 implemented by the virtual wearable computing device 210. For example, the virtual wearable computing device 210 may obtain sensor data (e.g., from object detection sensors that report data identifying detected objects). The virtual wearable computing device 210 may also obtain image data, and process the sensor and image data using one or more object detection techniques to identify the objects and the proximity to the objects. In embodiments, the virtual wearable computing device 210 may identify the type of object based on image/pixel-based analysis, heat analysis, infrared imaging analysis, and/or other techniques. For example, the virtual wearable computing device 210 may identify the object as being furniture based on sensor and/or image datasets that are consistent with furniture. In embodiments, the virtual wearable computing device 210 may identify an object as stationary or moving, and may determine the speed (e.g., velocity and direction) of the moving object.

The hazardous condition criteria repository 620 may include a data storage device (e.g., storage system 34 of FIG. 1) that stores criteria that stipulate conditions that qualify as a hazardous event or hazardous set of conditions. More specifically, the hazardous condition criteria repository 620 may store criteria that stipulate conditions under which view interchanging and alerting component 215 should provide an alert and/or interchange a displayed view from virtual content to real-world physical imaging. For example, the hazardous condition criteria repository 620 may store criteria that define a hazardous condition when the user is within a threshold distance of a particular type of object. More specifically, the hazardous condition criteria repository 620 may store criteria that specify that a hazardous condition is present when the user within a threshold distance of furniture, an individual, and/or other object. In embodiments, the threshold distance may vary based on the type of object (e.g., a greater threshold distance may apply for moving objects, such as individuals, pets, or vehicles, whereas a shorter threshold distance may apply for stationary objects, such as furniture, walls, etc.). Additionally, or alternatively, the threshold distance may vary based on a hazardous level associated with detected objects (e.g., a greater threshold distance may apply for vehicles whereas a shorter threshold distance may apply for small animals).

In embodiments, the criteria may stipulate that different individuals detected within proximity of the user may correspond to a hazardous event (e.g., the presence of one individual, as recognized by facial recognition techniques, may be considered to be a hazardous event whereas the presence of another individual may be considered to be a non-hazardous event).

In embodiments, the hazardous condition criteria repository 620 may store criteria that stipulate a type of alert and/or other action to perform based on the presence of a hazardous condition (e.g., the satisfaction of a set of criteria). For example, for different sets of criteria, different types of alert may be provided (e.g., an alert of a particular tone, volume, etc.). Also, for different types of criteria, different actions may be defined, such as maintaining virtual display while providing only an audible alert, or discontinuing virtual display in addition to providing an audible alert.

In embodiments, the criteria may be based on information stored by the user profile server 220. For example, different criteria may apply to different users having different profiles relating to hazardous conditions. Specifically, different sets of criteria (e.g., threshold distances, etc.) may apply based on a hazard level of a user. In embodiments, the hazardous condition criteria repository 620 may store criteria for defining the hazard level of the user based on information stored by the user profile server 220 (e.g., based on the user's accident history, reaction times, etc.).

The hazardous condition detection module 630 may include a program module (e.g., program module 42 of FIG. 1) that detects hazardous conditions based on satisfaction of one or more hazardous conditions as stored by the hazardous condition criteria repository 620. In embodiments, the hazardous condition detection module 630 may detect the satisfaction of the criteria by monitoring the proximity of the virtual wearable computing device 210 (and hence the user) to objects in the physical world (e.g., based on monitoring the data obtained and processed by the object detection and proximity monitoring module 610). In particular, the hazardous condition detection module 630 may detect the satisfaction of the criteria based on the proximity of the virtual wearable computing device 210 to objects (e.g., the distance between the virtual wearable computing device 210 and the objects). Additionally, or alternatively, the hazardous condition detection module 630 may detect individuals within proximity of the user based on facial recognition techniques, and may determine whether the presence of certain individuals constitutes a hazardous condition (e.g., based on information stored by the hazardous condition criteria repository 620 indicating which individuals, when present, constitute a hazardous event). Additionally, or alternatively, the hazardous condition detection module 630 may detect a hazardous condition based on actions and movements by surrounding individuals.

In embodiments, the hazardous condition detection module 630 may generate a hazard score based on the presence of obstructions, the proximity of the user to those obstructions, the type of obstruction, surrounding individuals corresponding the obstruction, actions performed by the surrounding individuals, etc. As described herein, the hazard score may be increased when the user is relatively closer to obstructions. Also, the hazard score may be increased based on the presence of obstructions with relatively higher hazard levels. The hazardous condition detection module 630 may detect a hazardous condition when the hazard score satisfies a threshold.

In embodiments, the hazardous condition detection module 630 may detect a hazardous condition based on the user's anticipated travel path and/or user movements. For example, based on the user's anticipated travel path and/or movements, the hazardous condition detection module 630 may identify a hazardous condition as one in which the user is anticipated to be within a threshold distance of an obstruction with which the user may be at risk of colliding should the user continue on the anticipate travel path or make the anticipated movements.

As described herein, the hazardous condition detection module 630 may anticipate the user's travel path and/or user movements based on details of the virtual content. For example, the hazardous condition detection module 630 may anticipate that a user may walk forward in a particular direction for 10 paces based on the content of the virtual application. Similarly, the hazardous condition detection module 630 may anticipate that a user may suddenly turn their body in one direction (e.g., based on virtual content that would trigger the user's movements, such as the sudden appearance of character or object in a virtual reality game, etc.).

The view interchange and alerting execution module 640 may include a program module (e.g., program module 42 of FIG. 1) that may receive an indication of the detection of a hazardous condition (e.g., from the hazardous condition detection module 630) and may perform a corresponding action. For example, the view interchange and alerting execution module 640 may interchange the view displayed on the virtual wearable computing device 210 from virtual content to real-life or physical world imagery (e.g., as captured by the camera devices of the virtual wearable computing device 210). Additionally, or alternatively, the view interchange and alerting execution module 640 may discontinue the display of the virtual content in order for the user to view the physical world without viewing virtual content (e.g., in an implementation where the virtual wearable computing device 210 includes transparent lenses or glasses). Additionally, or alternatively, the view interchange and alerting execution module 640 may provide an alert based on the detection of a hazardous condition (e.g., an audible alert, a visual alert viewable on the display of the virtual wearable computing device 210, etc.).

Figure 7:
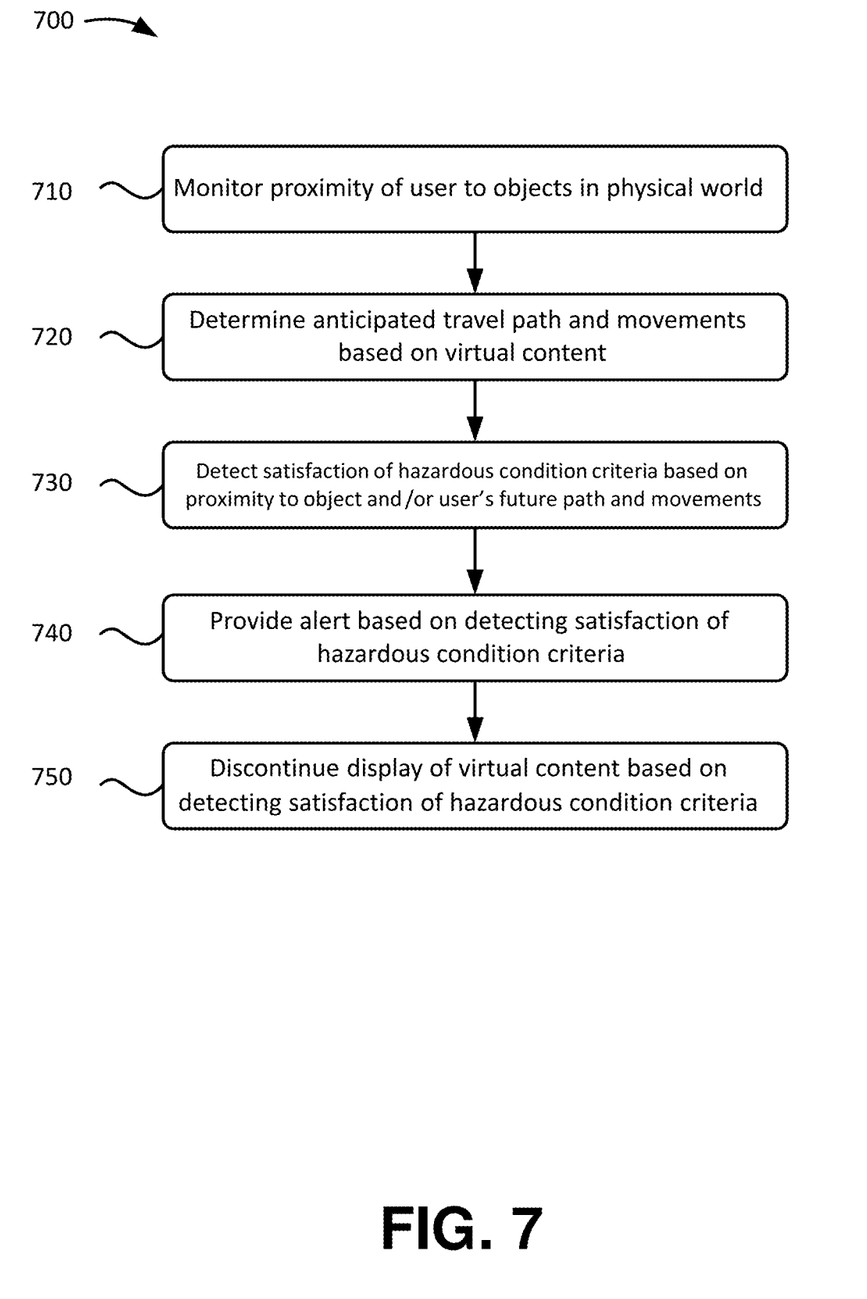
FIG. 7 shows a flowchart of an example process for providing an alert and/or discontinuing display of virtual content based on detecting a hazardous condition in accordance with aspects of the present invention.

FIG. 7 shows a flowchart of an example process for providing an alert and/or discontinuing display of virtual content based on detecting a hazardous condition in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include monitoring the proximity of a user to objects in the physical world (step 710). For example, as described above with respect to the object detection and proximity monitoring module 610 and the hazardous condition detection module 630, the view interchanging and alerting component 215 may monitor the proximity of a user to objects in the physical world (as opposed to monitoring the proximity of the user to objects in the virtual world). In particular, the object detection and proximity monitoring module 610 may monitor image and sensor data by cameras 214 and sensors 212 implemented by the virtual wearable computing device 210, detect the presence of objects/obstructions from the image and sensor data, and monitor the proximity to the objects.

Process 700 may also include determining anticipated future travel path and movements based on virtual content (step 720). For example, as described above with respect to the hazardous condition detection module 630, the view interchanging and alerting component 215 may anticipate the user's travel path and/or user movements based on details of the virtual content. For example, the view interchanging and alerting component 215 may anticipate that a user may walk forward in a particular direction for a particular distance or number of paces based on the content of the virtual application. Similarly, the view interchanging and alerting component 215 may anticipate that a user may suddenly turn their body in one direction (e.g., based on virtual content that would trigger the user's movements, such as the sudden appearance of character or object in a virtual reality game, etc.).

Process 700 may further include detecting the satisfaction of hazardous condition criteria based on the proximity (step 730). For example, as described above with respect to the hazardous condition detection module 630, the view interchanging and alerting component 215 may detect the satisfaction of the criteria based on the proximity of the virtual wearable computing device 210 to objects (e.g., the distance between the virtual wearable computing device 210 and the objects). Additionally, or alternatively, the view interchanging and alerting component 215 may detect a hazardous condition based on the user's anticipated travel path and/or user movements. For example, based on the user's anticipated travel path and/or movements, the view interchanging and alerting component 215 may identify a hazardous condition as one in which the user is anticipated to be within a threshold distance of an obstruction with which the user may be at risk of colliding should the user continue on the anticipate travel path or make the anticipated movements.

Process 700 may also include providing an alert based on detecting the satisfaction of the hazardous condition criteria (step 740). For example, as described above with respect to the view interchange and alerting execution module 640, the view interchanging and alerting component 215 may provide an alert based on the detection of a hazardous condition (e.g., an audible alert, a visual alert viewable on the display of the virtual wearable computing device 210, etc.).

Process 700 may further include discontinuing the display of virtual content based on detecting the satisfaction of hazardous condition criteria (step 750). For example, as described above with respect to the view interchange and alerting execution module 640, the view interchanging and alerting component 215 may discontinue the display of virtual content and may interchange the display to real-life or physical world imagery (e.g., as captured by the camera devices of the virtual wearable computing device 210). Additionally, or alternatively, the view interchanging and alerting component 215 may discontinue the display of the virtual content in order for the user to view the physical world without viewing virtual content (e.g., in an implementation where the virtual wearable computing device 210 includes transparent lenses or glasses).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a virtual wearable computing device communicating with a network and using a profile, a hazardous condition based on monitoring a proximity of a user to a physical obstruction and based on an anticipated travel path or anticipated movements;
   generating an alert, by the virtual wearable computing device, based on the detection of the hazardous condition;
   discontinuing, by the virtual wearable computing device, virtual content on a display of the virtual wearable computing device; and
   displaying, by the virtual wearable computing device, real-world images as seen by cameras of the virtual wearable computing device on the display of the virtual wearable computing device.

2. The method of claim 1, wherein the anticipated travel path or anticipated movements of the user wearing the virtual wearable computing device is based on the virtual content on the display of the virtual wearable computing device.

3. The method of claim 2, wherein the generating the alert comprises providing an audible alert or providing a visual alert on the display of the virtual wearable computing device, and the discontinuing the virtual content on the display of the virtual wearable computing device occurs immediately in view of the providing the audible alert or the providing the visual alert.

4. The method of claim 3, wherein the detecting the hazardous condition is based on detecting a satisfaction of criteria defining the hazardous condition, and the providing the audible alert or the providing the visual the alert further includes detecting the satisfaction of the criteria.

5. The method of claim 1, wherein the detecting the hazardous condition is based on detecting the physical obstruction being within a threshold distance of the user.

6. The method of claim 1, wherein the detecting the hazardous condition is based on detecting satisfaction of criteria defining the hazardous condition.

7. The method of claim 6, wherein the criteria are based on the profile associated with the user, the profile including at least one selected from the group consisting of:
   user reaction times;
   user accident history; and
   user age.

8. The method of claim 6, wherein the criteria include different threshold distances for different types of physical obstructions.

9. The method of claim 1, wherein a service provider at least one of creates, maintains, deploys and supports the computing device.

10. The method of claim 1, wherein the monitoring, the detecting the hazardous condition, and the alerting are provided by a service provider on a subscription, advertising, and/or fee basis.

11. The method of claim 1, wherein the computing device includes software provided as a service in a cloud environment.

12. The method of claim 1, wherein the profile is a user profile, the method further comprising deploying a system for alerting the user of the hazardous condition while the user is engaged in a virtual application while wearing the virtual wearable computing device, wherein the deploying the system comprises providing a computer infrastructure operable to perform the detecting the hazardous condition, and the generating the alert.

13. A computer program product comprising a computer readable storage medium having program instructions embodied therewith, the program instructions executable by a virtual wearable computing device to cause the virtual wearable computing device to:
   detect, by communication with a network and using a profile, a hazardous condition based on monitoring a proximity of a user to a physical obstruction and based on an anticipated travel path or anticipated user movements;
   generate an alert based on the detection of the hazardous condition;
   discontinue virtual content on a display of the virtual wearable computing device;
   provide the alert to the virtual wearable computing device; and
   display real-world images immediately as seen by cameras of the virtual wearable computing device on the display of the virtual wearable computing device in response to the provided alert.

14. The computer program product of claim 13, further comprising program instructions to determine the anticipated travel path or anticipated user movements of the user based on the proximity of the user and based on a virtual content on the display of the virtual wearable computing device.

15. The computer program product of claim 13, further comprising program instructions to monitor the proximity of the physical obstruction based on receiving image data and sensor data from a camera device and a sensor device implemented within the virtual computing device.

16. The computer program product of claim 13, further comprising program instructions to provide the alert by an audible alert or a visual alert.

17. The computer program product of claim 13, further comprising program instructions to detect the hazardous condition based on detecting a satisfaction of criteria defining the hazardous condition based on a presence of different individuals.

18. A system comprising:
   a CPU, a computer readable memory and a computer readable storage medium associated with a virtual wearable computing device;
   program instructions to detect, by communication with a network and using a profile, a hazardous condition based on monitoring a proximity of a user to a physical obstruction and based on an anticipated travel path or anticipated movements;
   program instructions to generate an alert based on the detection of the hazardous condition;
   program instructions to discontinue virtual content on a display of the virtual wearable computing device;
   program instructions to provide the alert to the virtual wearable computing device based on detecting a satisfaction of criteria defining the hazardous condition; and
   program instructions to display real-world images immediately as seen by cameras of the virtual wearable computing device on the display of the virtual wearable computing device in response to the provided alert,
   wherein the program instructions are stored on the computer readable storage medium for execution by the CPU via the computer readable memory.

19. The system of claim 18, further comprising program instructions to monitor the proximity of the physical obstruction based on receiving image data and sensor data from a camera device and a sensor device implemented within the virtual computing device.

20. The system of claim 18, further comprising at least one of:
   program instructions to discontinue display of virtual content based on the detection of the hazardous condition; and
   program instructions to provide an audible or visual alert to provide the alert to the virtual wearable computing device based on satisfaction of criteria defining the hazardous condition.

* * * * *